United States Patent
Aarts

(10) Patent No.: US 8,189,809 B2
(45) Date of Patent: May 29, 2012

(54) AUDIO DEVICE FOR IMPROVED SOUND REPRODUCTION

(75) Inventor: Ronaldus Maria Aarts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1334 days.

(21) Appl. No.: 11/815,108

(22) PCT Filed: Jan. 30, 2006

(86) PCT No.: PCT/IB2006/050318
§ 371 (c)(1),
(2), (4) Date: Jul. 31, 2007

(87) PCT Pub. No.: WO2006/082553
PCT Pub. Date: Aug. 10, 2006

(65) Prior Publication Data
US 2010/0046787 A1    Feb. 25, 2010

(30) Foreign Application Priority Data
Feb. 3, 2005 (EP) ..................................... 05300086

(51) Int. Cl.
*H04B 15/00* (2006.01)

(52) U.S. Cl. .......... 381/94.1; 381/92; 381/93; 381/94.2; 381/94.3; 381/94.9; 381/95; 381/96; 381/98; 381/99; 381/101; 381/102; 381/103; 381/396

(58) Field of Classification Search .................. None
See application file for complete search history.

(56) References Cited

U.S. PATENT DOCUMENTS

| | | | |
|---|---|---|---|
| 5,388,992 A | 2/1995 | Franklin et al. | |
| 5,528,697 A | 6/1996 | Saito | |
| 6,298,141 B1 | 10/2001 | Hickman et al. | |
| 6,628,798 B2 | 9/2003 | Teshima et al. | |
| 6,809,635 B1 | 10/2004 | Kaaresoja | |
| 2004/0252857 A1 | 12/2004 | Lewis | |

FOREIGN PATENT DOCUMENTS

| | | |
|---|---|---|
| EP | 1053796 A1 | 11/2000 |
| EP | 1170709 A2 | 1/2002 |
| EP | 1222971 A1 | 7/2002 |
| WO | WO2005027570 A1 | 3/2005 |
| WO | WO2005/027570 A1 * | 3/2005 |

\* cited by examiner

*Primary Examiner* — Charles Garber
*Assistant Examiner* — Yasser Abdelaziez

(57) ABSTRACT

An audio device includes a first audio path with a loudspeaker for reproducing an audio signal, and a second audio path. The second audio path includes in series a band-pass filter for filtering an audio signal, a detector for detecting the amplitude of the band-pass filtered audio signal, a multiplier for multiplying a periodic signal by the amplitude of the band-pass filtered audio signal, and a vibration device for reproducing the multiplied periodic signal. The frequency of the periodic signal is substantially equal to the resonance frequency of the vibration device.

8 Claims, 1 Drawing Sheet

AUDIO DEVICE FOR IMPROVED SOUND REPRODUCTION

FIELD OF THE INVENTION

The present invention relates to audio device comprising a first audio path comprising a loudspeaker for reproducing the higher frequency part of an audio signal, and a second audio path comprising a vibration device for reproducing the lower frequency part of the audio signal.

This invention may be used, for example, in mobile phones or in gaming devices.

BACKGROUND OF THE INVENTION

The U.S. Pat. No. 6,809,635 discloses a mobile telecommunications device which splits the demodulated audio communications into two paths. The first path comprises in series a low-pass filter, a first audio amplifier and a vibration motor. The second path comprises in series a high-pass filter, a second audio amplifier and a tweeter. The pass-band of the two filters may be chosen to change the sound quality of the audio communications which is reproduced. The output of the low-pass filter, which passes the lower frequency components in a substantially non-attenuated manner and substantially attenuates the higher frequency components is an input to the first audio amplifier having a relatively high gain for driving the vibration motor with sufficient input power to produce an acceptable output of audible sound which reproduces the lower frequency components present in the audio communications. The output of high-pass filter is an input to the second audio amplifier having a relatively lower gain than the gain of the first audio amplifier as a result of the higher efficiency of the tweeter in reproducing the higher frequency audible sound.

SUMMARY OF THE INVENTION

It is an object of the invention to propose an audio device which permit an improved sound reproduction compared with the one of the prior art.

To this end, the audio device in accordance with the invention is characterized in that it comprises:
- a band-pass filter for passing frequency components of the audio signal lying between a first frequency and a second frequency, said first frequency being lower than said second frequency, and for attenuating frequency components of the audio signal lower than said first frequency and higher than said second frequency,
- a detector for detecting an amplitude of the band-pass filtered audio signal,
- a multiplier for multiplying a periodic signal having a third frequency by the amplitude of the band-pass filtered audio signal,
- a vibration device for reproducing the multiplied periodic signal, wherein the third frequency is substantially equal to the resonance frequency of the vibration device.

Thanks to a processing device comprising in series the band-pass filter, the detector and the multiplier, the lower frequency part of the audio signal is reproduced in a very efficient and accurate manner.

The first audio path may comprise a high-pass filter for passing frequency components of the audio signal higher than the second frequency and for attenuating frequency components of the audio signal lower than said second frequency, the loudspeaker being adapted to reproduce the high-pass filtered audio signal. This first audio path may further comprise an amplifier for amplifying the audio signal, the loudspeaker being adapted to reproduce the amplified audio signal.

Beneficially, the detector is a peak detector or an envelope detector or a diode and the first frequency is substantially equal to 20 Hz and the second frequency is substantially equal to 100 Hz.

The second audio path may comprise a generator for generating the periodic signal. It may also comprise a low-pass filter arranged between the detector and the multiplier, for passing frequency components of the detected band-pass filtered audio signal lower than the second frequency and for attenuating frequency components of the detected band-pass filtered audio signal higher than said second frequency. This second audio path may comprise a control path arranged between the vibration device and the generator, the generator being adapted to adjust the third frequency in dependence on parameters of the vibration device. It may also comprise an amplifier arranged between the multiplier and the vibration device.

The present invention also relates to a mobile phone comprising such an audio device.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
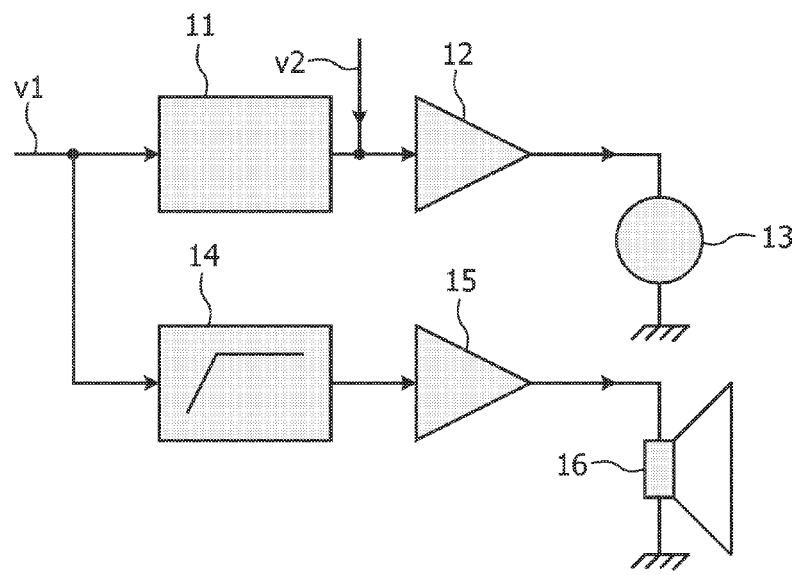
FIG. 1 is a block diagram of the audio device in accordance with the invention.

Referring to FIG. 1, the audio device in accordance with the invention is depicted. The audio device may be incorporated in a portable apparatus which is, for example, a mobile phone. However, it will be apparent to a skilled person that this portable apparatus can be any other portable apparatus comprising an audio device such as, for example, a personal digital assistant PDA, a gaming device, etc.

The portable apparatus comprises an audio receiver (not represented), e.g. a radio frequency RF receiver in the example of a mobile phone, for receiving an input audio signal and for providing a demodulated output audio signal v1 in the same example.

The demodulated output audio signal v1 is then split into two paths. The first path comprising in series a processing device 11, which will be described in more detail hereinafter, a first audio amplifier 12, and a vibration device 13, e.g. a conventional transducer. Additionally, the vibration device 13 is utilized to perform its conventional function of producing a silent vibration alert when programmed to do so by the user of the mobile phone in response to incoming calls or messages v2. The first audio amplifier 11 has typically a relatively high gain for driving the vibration device 13 with sufficient input power to produce an acceptable output of audible sound.

The second path comprises in series a high-pass filter 14, a second audio amplifier 15 and a conventional loudspeaker 16. The high-pass filter 14 passes substantially the higher frequency components (e.g. above than 100 Hz) in a substantially non-attenuated manner and substantially attenuates the lower frequency components (e.g. below 100 Hz). The second audio amplifier 15 has a relatively lower gain than the gain of the first audio amplifier as a result of the higher efficiency of the loudspeaker 16 in reproducing the higher frequency audible sound.

The high-pass filter is not essential to a proper operation of the audio device. It could be replaced by a band-pass filter or there could even be no filter at all.

The portable apparatus may comprise a handset and a headset. In this case, the vibration device 13 can be in the handset or in the headset or both. The same applies to the loudspeaker. The handset and headset may be wired or wireless connected to each other.

Figure 2:
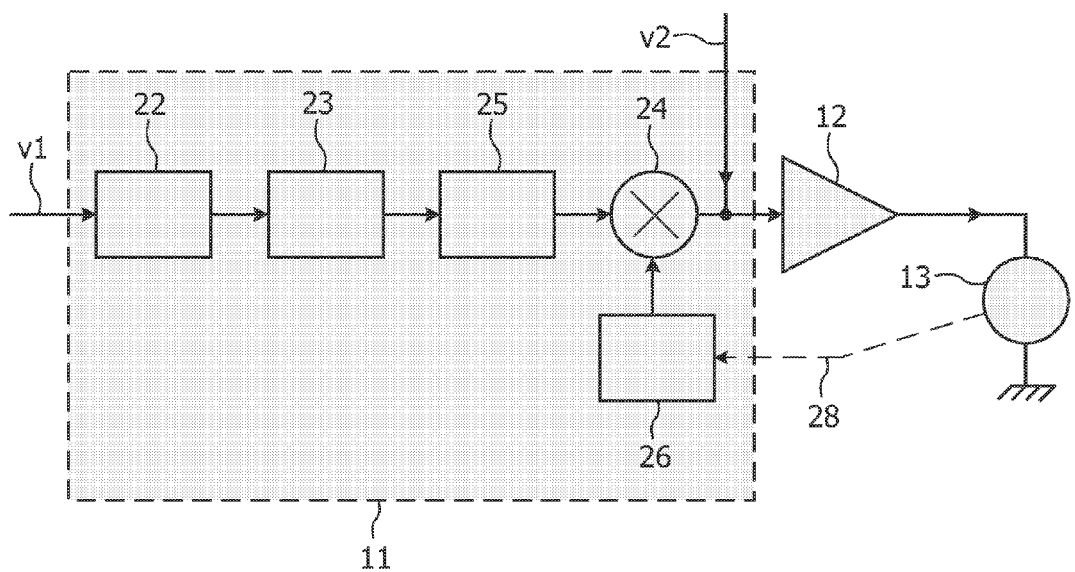
FIG. 2 is a block diagram of the processing device in accordance with the invention.

The processing device in accordance with the invention is schematically shown in FIG. 2. The processing device 11 comprises a band-pass filter 22, a detector 23 and a multiplier 24.

The band-pass filter 22 has a pass-band which corresponds to the low frequency range, that is to say approximately 20 Hz-100 Hz. The band-pass filter 22 thus eliminates all frequencies outside this low frequency range.

The detector 23 is adapted to detect the signal received from the band-pass filter 22. The detector 23 is for example a peak detector known per se, but may also be an envelope detector known per se. In a very economical embodiment, the detector may be constituted by a diode. The signal produced by the detector 23 represents the amplitude of the combined signals present within the low frequency range.

Multiplier 24 multiplies this signal by a periodic (e.g. sinusoidal) signal having a frequency $f_G$ which is generated by a generator 26. The generator frequency $f_G$ is beneficially equal to the resonance frequency $f_0$ of the vibration device.

The output signal of the multiplier 24 has a frequency $f_G$ while its amplitude is dependant on the signals contained in the low frequency range. Note that any signal contained in the low frequency range will cause an output signal having a frequency equal to $f_G$ to be produced.

In addition, the processing device may comprise a low-pass filter 25 arranged between the detector 23 and the multiplier 24, for attenuating the higher frequency components (above 100 Hz). This low-pass filter serves to reduce any undesired frequencies which may be generated by the detector 23.

The vibration device 13 is preferably driven at its resonance frequency $f_0$. This results in a high sound level. As will be clear from the above discussion, the processing device produces sound output at the resonance frequency $f_0$ for all audio signals falling within the low frequency range defined by band-pass filter 22. This makes it possible to "adjust" low audio frequencies to the properties of the vibration device in order to reproduce them at a suitable sound level.

Optionally, a control path 28 may be present between the vibration device 13 and the generator 26. This control path allows the generator 26 to adjust the frequency $f_0$ in dependence on parameters of the vibration device such as its (instantaneous) impedance, in particular since $f_0$ may vary due, for example, to temperature variations and/or deviations in production parameters.

It should be noted that the above-mentioned embodiment illustrates rather than limits the invention, and that those skilled in the art will be capable of designing many alternative embodiments without departing from the scope of the invention as defined by the appended claims.

For example, the principle of the invention can be generalized to more than two paths, each additional path comprising an additional processing device and an additional vibration device, each vibration device corresponding to a given low frequency range. In that case, the final audio signal heard by a user is the sum of the high frequency audio signal coming from the loudspeaker and the low frequency audio signals coming from the different vibration devices.

In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An audio device comprising a first audio path comprising a loudspeaker for reproducing an audio signal, and a second audio path comprising in series:
    a band-pass filter for passing frequency components of the audio signal lying between a first frequency and a second frequency, said first frequency being lower than said second frequency, and for attenuating frequency components of the audio signal lower than said first frequency and higher than said second frequency,
    a detector for detecting an amplitude of the band-pass filtered audio signal,
    a multiplier for multiplying a periodic signal having a third frequency by the amplitude of the band-pass filtered audio signal,
    a vibration device for reproducing the multiplied periodic signal, wherein the third frequency is substantially equal to a resonance frequency of the vibration device,
    wherein the second audio path further comprises a generator for generating the periodic signal, and
    wherein the second audio path further comprises a control path arranged between the vibration device and the generator, the generator being adapted to adjust the third frequency in dependence on parameters of the vibration device.

2. The audio device as claimed in claim 1, wherein the first audio path further comprises a high-pass filter for passing frequency components of the audio signal higher than the second frequency and for attenuating frequency components of the audio signal lower than said second frequency, the loudspeaker being adapted to reproduce the high-pass filtered audio signal.

3. An audio device as claimed in claim 1, wherein the first audio path further comprises an amplifier for amplifying the audio signal, the loudspeaker being adapted to reproduce the amplified audio signal.

4. The audio device as claimed in claim 1, wherein the detector is a peak detector or an envelope detector or a diode.

5. The audio device as claimed in claim 1, wherein the second audio path further comprises a low-pass filter arranged between the detector and the multiplier, for passing frequency components of the detected band-pass filtered audio signal lower than the second frequency and attenuating frequency components of the detected band-pass filtered audio signal higher than said second frequency.

6. The audio device as claimed in claim 1, wherein the first frequency is substantially equal to 20 Hz and the second frequency is substantially equal to 100 Hz.

7. The audio device as claimed in claim 1, wherein the second audio path further comprises an amplifier arranged between the multiplier and the vibration device.

8. A mobile phone comprising an audio device, the audio device comprising a first audio path comprising a loudspeaker for reproducing an audio signal, and a second audio path comprising in series:
- a band-pass filter for passing frequency components of the audio signal lying between a first frequency and a second frequency, said first frequency being lower than said second frequency, and for attenuating frequency components of the audio signal lower than said first frequency and higher than said second frequency,
- a detector for detecting an amplitude of the band-pass filtered audio signal,
- a multiplier for multiplying a periodic signal having a third frequency by the amplitude of the band-pass filtered audio signal,
- a vibration device for reproducing the multiplied periodic signal, wherein the third frequency is substantially equal to a resonance frequency of the vibration device, wherein the second audio path further comprises a generator for generating the periodic signal, and wherein the second audio path further comprises a control path arranged between the vibration device and the generator, the generator being adapted to adjust the third frequency in dependence on parameters of the vibration device.

* * * * *